United States Patent
Banerjee et al.

(10) Patent No.: US 9,965,848 B2
(45) Date of Patent: May 8, 2018

(54) SHAPE BASED GROUPING

(71) Applicant: KLA-Tencor Corporation, Milpitas, CA (US)

(72) Inventors: Saibal Banerjee, Fremont, CA (US); Ashok Kulkarni, San Jose, CA (US); Jagdish Saraswatula, Chennai (IN); Santosh Bhattacharyya, San Jose, CA (US)

(73) Assignee: KLA-Tencor Corporation, Milpitas, CA (US)

(*) Notice: Subject to any disclaimer, the term of this patent is extended or adjusted under 35 U.S.C. 154(b) by 0 days. days.

(21) Appl. No.: 15/355,606

(22) Filed: Nov. 18, 2016

(65) Prior Publication Data

US 2017/0186151 A1    Jun. 29, 2017

Related U.S. Application Data

(60) Provisional application No. 62/293,757, filed on Feb. 10, 2016.

(30) Foreign Application Priority Data

Dec. 23, 2015 (IN) ............................ 6863/CHE/2015

(51) Int. Cl.
*G06K 9/00* (2006.01)
*G06T 7/00* (2017.01)

(52) U.S. Cl.
CPC .. *G06T 7/0006* (2013.01); *G06T 2207/10061* (2013.01); *G06T 2207/30148* (2013.01)

(58) Field of Classification Search
CPC ..... G06T 7/001; G06T 7/0004; G06T 7/0006; G06T 7/0051; G06T 2207/30148; G01N 21/95607; G01N 21/9501
See application file for complete search history.

(56) References Cited

U.S. PATENT DOCUMENTS

| | | | | |
|---|---|---|---|---|
| 4,800,268 A | * | 1/1989 | Miyoshi | G01N 21/9501 250/234 |
| 6,628,818 B1 | * | 9/2003 | Nakano | G06T 7/0006 382/149 |
| 6,800,859 B1 | * | 10/2004 | Shishido | G01J 3/10 250/372 |
| 7,877,722 B2 | | 1/2011 | Duffy et al. | |
| 9,846,934 B2 | * | 12/2017 | Zafar | G06T 7/001 |
| 2002/0168787 A1 | | 11/2002 | Noguchi et al. | |
| 2004/0253748 A1 | | 12/2004 | Neo et al. | |

(Continued)

OTHER PUBLICATIONS

ISA/KR, International Search Report for PCT/US2016/066681 dated Apr. 5, 2017.

(Continued)

*Primary Examiner* — Amir Alavi
(74) *Attorney, Agent, or Firm* — Hodgson Russ LLP

(57) ABSTRACT

Shape primitives are used for inspection of a semiconductor wafer or other workpiece. The shape primitives can define local topological and geometric properties of a design. One or more rules are applied to the shape primitives. The rules can indicate presence of a defect or the likelihood of a defect being present. A rule execution engine can search for an occurrence of the shape primitives covered by the at least one rule.

20 Claims, 9 Drawing Sheets

(56) References Cited

U.S. PATENT DOCUMENTS

| | | | |
|---|---|---|---|
| 2010/0215247 A1* | 8/2010 | Kitamura | G06T 7/001 382/149 |
| 2011/0242312 A1 | 10/2011 | Seki et al. | |
| 2015/0234379 A1* | 8/2015 | Vajaria | H01L 22/12 700/121 |
| 2015/0324965 A1 | 11/2015 | Kulkarni | |
| 2015/0356233 A1 | 12/2015 | Fouquet et al. | |
| 2017/0186151 A1* | 6/2017 | Banerjee | G06T 7/0006 |
| 2017/0213796 A1* | 7/2017 | Fischer | H01L 23/544 |
| 2017/0243738 A1* | 8/2017 | Noda | G03F 7/20 |
| 2017/0244936 A1* | 8/2017 | Koga | G01N 21/8806 |

OTHER PUBLICATIONS

ISA/KR, Written Opinion of the International Searching Authority for PCT/US2016/066681 dated Apr. 5, 2017.

\* cited by examiner

SHAPE BASED GROUPING

CROSS-REFERENCE TO RELATED APPLICATIONS

This application claims priority to the Indian provisional patent application assigned App. No. 6863/CHE/2015 filed Dec. 23, 2015 and to the U.S. provisional patent application assigned U.S. App. No. 62/293,757 filed Feb. 10, 2016, the disclosures of which are hereby incorporated by reference.

FIELD OF THE DISCLOSURE

This disclosure relates to image analysis.

BACKGROUND OF THE DISCLOSURE

Wafer inspection systems help a semiconductor manufacturer increase and maintain integrated circuit (IC) chip yields by detecting defects that occur during the manufacturing process. One purpose of inspection systems is to monitor whether a manufacturing process meets specifications. The inspection system indicates the problem and/or the source of the problem if the manufacturing process is outside the scope of established norms, which the semiconductor manufacturer can then address.

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

The process of inspecting semiconductor wafers to detect defects is important to semiconductor manufacturers. Defects cause wafer yields to decline, causing increases in overall semiconductor manufacturing costs. These cost inflations are eventually passed down to the consumer who has to pay a higher price for all products having electronic components, from phones to automobiles. Inspection tools with their automated detection of defects on wafers provide semiconductor manufacturers the ability to automatically detect defects. Thereafter, these defects can be eliminated by the manufacturer by changing one or more of their designs or processes.

The process of reviewing semiconductor defects in a semiconductor fabrication facility or foundry is expensive in terms of both human effort and time. The more efficient the review sampling, the lower the operational costs will be. Review tools can produce resolved and high magnification images for a user, but review tools tend to be slow. The user has to review the defects in these images for appropriate countermeasures to be taken. To do this, the user classifies the defects into types that can pinpoint the cause of the defect. This classification process requires extensive human effort and is slow, which results in high operational costs. Review would be improved if every defect (cause) type was sampled in one sampling without missing defects.

After an inspection process, the local designs at the defect locations (returned by inspection) are grouped by a method called Design Based Grouping (DBG). Depending upon the statistics of these groups, one or more locations from each group are chosen for review sampling. DBG employs an encoding scheme for each corner and surrounding geometry. This information is used to quickly find all patterns that exactly match a given pattern. This means that two locations are in a DBG group if their designs match exactly, and the design patterns of two locations that look similar but are numerically different even to a small extent fall into different groups.

By the quantitative nature of its language and coding mechanism, users have difficulty writing "rules" with DBG. This capability can be important because a user knows from experience the vulnerable locations on the layer that are likely to cause defects. The defects arising at these locations can be rare but disastrous, and DBG based review sampling that relies solely on statistics may miss this tiny population if limits are set on the sample size. The DBG methodology also does not explicitly indicate the design violations and weaknesses that cause systematic defects. It only does so by examples of patterns based on defect frequencies of those pattern encodings.

DBG grouping is carried out by performing exact matching, which means that two locations are in a DBG group if their designs match exactly, and the design patterns of two locations that look similar but are numerically different fall into different groups. This can create too many groups. Hence, a sampling which relies on DBG groups may miss an important defect type, or it may sample too many of the same type. These DBG deficiencies may not result in efficient review sampling.

Besides DBG, a language used in Design Rule Check(s) (DRC) or Mask Rule Check(s) (MRC) can determine whether the physical layout of a particular chip layout satisfies a series of recommended parameters called Design Rules. DRC is an application of Standard Verification Rule Format (SVRF) scripting. DRC rules are a set of specific rules (written using SVRF) that are dimension driven. A purpose of DRC is to ensure the adherence of design to rules for the ease of manufacturability.

For most Computer-Aided Design (CAD) tools, the SVRF is a common scripting language that is used for design/polygon manipulation. For example, SVRF can be used to manipulate polygons and find physical layout properties (e.g., minimum spaces, minimum widths) in the semiconductor-design layout (e.g., a physical design). This language requires an exact knowledge of distances between shape primitives and exact spatial relationship in order to define a pattern of interest (POI). Therefore, there can be thousands of such complex rules that are checked for violations when the design is laid out to decide which parts need Optical Proximity Correction (OPC). However, there are problems with using a language such as SVRF.

Very-large-scale integration (VLSI) chip manufacturing is done in a sub-diffraction regime. As a result, it may need to heavily compensate for proximity effects arising out of diffraction from complex 2-D like gratings (e.g., photo masks). In spite of the nature of this domain, most of the rule checks done on the semiconductor design files are dimensional checks (e.g., space, width, coverage etc.). At various stages of the manufacturing flow, from DRC to MRC, there are not rules that check relational parameters of a design that may be heavily impacted by proximity effects.

In electronic design automation, DRC can be used to determine whether the physical layout of a particular chip satisfies a series of recommended parameters called design rules. DRC can be done by writing out a program using the SVRF language. However, just like one programming language is better suited for certain programming tasks than others, SVRF-DRC is not suited for a fuzzy rule search engine application because SVRF-DRC is a scientifically crisp, dimension driven language. Because DRC is a crisp decision making process, the SVRF scripting language supports this crispness. The crisp language of SVRF-DRC does not account for any unforeseen changes and/or impediments.

In SVRF, a physical design layout is polygon information in the form of coordinates. SVRF is optimized to decipher information like edges, spaces, width, or area based on the coordinate information. SVRF then uses this information to perform more complicated operations on the layout. One polygon attribute that SVRF uses is an edge. SVRF constructs all other polygon properties like line-ends, convex corners, or concave corners based on the edges. The process of constructing other polygon attributes using SVRF dilutes the purity of the rule by introducing false positives. Modifying SVRF to give a range of dimensions will increase the possibility of catching false positives because of innumerable, similar polygon combinations present in the layout.

The SVRF language also does not provide the user with a UI to quickly master the language. Thus, it forces users to spend considerable amount of time, effort, and resources to learn this new scripting language. The concept of similar kinds of patterns is difficult to specify using a scripting language like SVRF. The violation of traditional dimensionality checks in a DRC using a rule table written in SVRF or some other similar language is not an accurate pointer to process or manufacturing flaws.

Therefore, what is needed are improved systems and techniques for review sample of defects.

BRIEF SUMMARY OF THE DISCLOSURE

In a first embodiment, a system is provided. The system comprises a review tool and a controller. The review tool includes a stage configured to hold a wafer and an image generation system configured to generate an image of the wafer. The controller is in electronic communication with the review tool. The controller is configured to: request design polygons in a field of view centered at one or more defect locations of the wafer; render a binary image showing the design polygons in the field of view; extract shape primitives that define local topological and geometric properties of a design; and apply at least one rule to the shape primitives using a rule execution engine. The rule execution engine searches for an occurrence of the shape primitives covered by the at least one rule. The rule corresponds to presence of a defect. The controller may include a processor and a communication port in electronic communication with the processor and the electronic data storage unit.

The image generation system can be configured to use at least one of an electron beam, a broad band plasma, or a laser to generate the image of the wafer. In an example, the review tool is a broad band plasma tool.

The controller may be configured to generate shape-based grouping bins with the rule execution engine.

The rule can apply to the shape primitives on multiple layers of the wafer.

The rule can be applied in a rule interaction window.

The controller can be further configured to infer one or more additional rules for a population of the defect locations.

In a second embodiment, a method is provided. The method comprises: requesting, using a controller, design polygons in a field of view centered at one or more defect locations of a wafer; rendering, using the controller, a binary image showing the design polygons in the field of view; extracting, using the controller, shape primitives that define local topological and geometric properties of a design; and applying at least one rule to the shape primitives using a rule execution engine. The rule execution engine searches for an occurrence of the shape primitives covered by the at least one rule. The rule corresponds to presence of a defect.

The method can further comprise generating, using the controller, shape-based grouping bins with the rule execution engine.

The rule may apply to the shape primitives on multiple layers of the wafer.

The rule can be applied in a rule interaction window.

The method can further comprise inferring one or more additional rules for a population of the defect locations.

The method can further comprise loading the wafer onto a stage of a review tool and imaging the wafer on the stage.

The method can further comprise: determining at least one location of the occurrence of the shape primitives covered by the at least one rule; converting the at least one location to a map that is configured to assign a sensitivity to different regions based on the rule and criticality; and binning the defect at the at least one location.

In a third embodiment, a non-transitory computer-readable storage medium, comprising one or more programs for executing steps on one or more computing devices is provided. The steps comprise: requesting design polygons in a field of view centered at one or more defect locations of a wafer; rendering a binary image showing the design polygons in the field of view; extracting shape primitives that define local topological and geometric properties of a design; and applying at least one rule to the shape primitives using a rule execution engine. The rule execution engine searches for an occurrence of the shape primitives covered by the at least one rule. The rule corresponds to presence of a defect.

The steps can further comprise generating shape-based grouping bins with the rule execution engine.

The rule may apply to the shape primitives on multiple layers of the wafer.

The steps can further comprise inferring one or more additional rules for a population of the defect locations.

The steps can further comprise determining at least one location of the occurrence of the shape primitives covered by the at least one rule; converting the at least one location to a map that is configured to assign a sensitivity to different regions based on the rule and criticality; and binning the defect at the at least one location.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Shape based grouping (SBG) can improve the efficiency of the review sampling of systematic defects caused by failure prone local design patterns called "hotspots" on a semiconductor wafer in a fabrication facility or foundry through a succinct description of the local spatial relationships between the shapes in the design describing the local circuit pattern on the wafer layer(s), possibly coupled with the corresponding image data from an inspection or review tool. The defects at these locations are assumed to be caused by a weak or faulty design, lithographic process, or semiconductor manufacturing processes (as opposed to external "fall-on" defects). Catching these defects in an efficient manner will reduce overall production costs for a semiconductor manufacturer. A user can then write a "rule" that specifies these weak local design geometries in terms of shape primitives and spatial relationships between them.

There are locations on the wafer that are more failure prone than others because of the weak or faulty local design pattern at those locations. At these critical locations, there is a higher possibility that defects will be created during lithographic or semiconductor manufacturing processes (as opposed to external "fall-on" random defects). By identifying the local spatial relationships between the shapes in the design that cause weaknesses, SBG provides the means for a more sensitized and pinpointed inspection at these critical locations. In this manner, SBG can assist or augment several inspection methods and related methodologies on various defect inspection tools that include, but are not limited to, broad band plasma (BBP) inspection tools and scanning electron microscope (SEM) inspection tools. These inspection methods and related methodologies that can be assisted or augmented include: regular die to die inspection; hotspot inspection; single die inspection; optical mode finding; and/or new defect type discovery.

Figure 9:
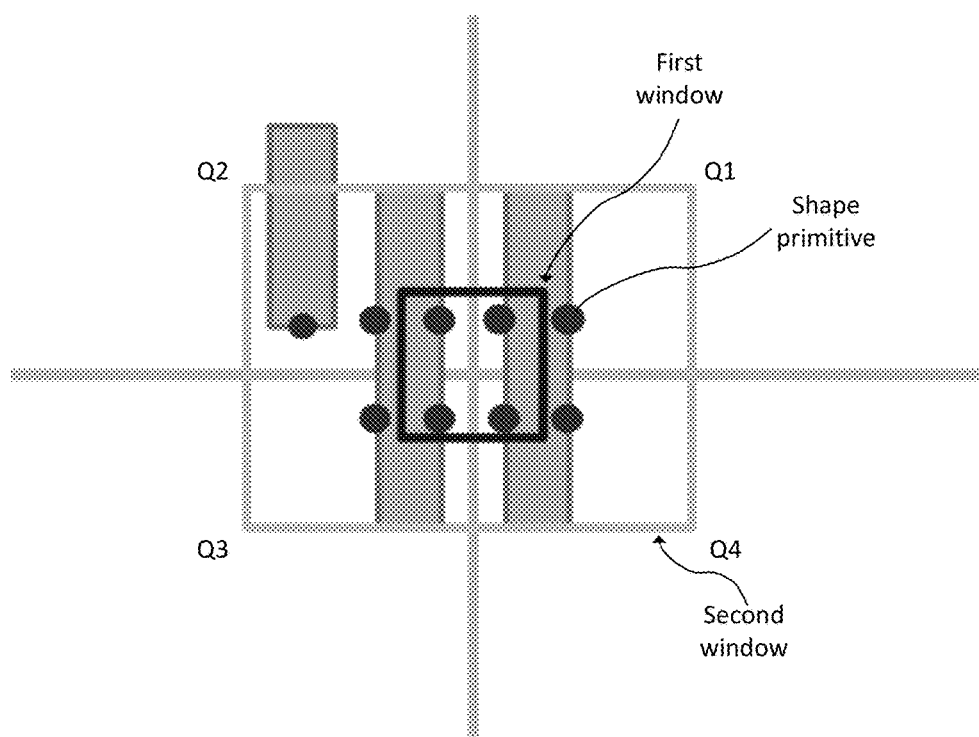
FIG. 9 is an exemplary die structure with two rule interaction windows and defined shape primitives.

SBG uses a digitized image of the pattern within a certain window, as seen in FIG. 9. It detects pattern types (primitives) by image processing such as shown by the solid fill circles in FIG. 9. It recognizes the presence of these primitives within a window (with four quadrants as shown in FIG. 9). The "rule" is then defined by the presence of these primitives with the given arrangement in the four quadrants. To describe this same configuration in SVRF would require an elaborate script which may also catch other areas not of interest (i.e., false positives). The image-based analysis allows for classifying each "pixel," which can be of an arbitrarily small size, as critical or not, depending on whether the above arrangement is satisfied. Once such a rule is defined, the existence of any point in the design that satisfies this rule can be checked by moving this window center to each pixel and performing this test. SBG is more accurate and easier to use compared to SVRF.

SBG is like a language where all these primitives (e.g., edge, line-end, convex corner, concave corner, etc.) along with their respective orientations are the basic building blocks. A fuzzy search can be part of SBG search because of the extent of the rule window and the central region parameters. SBG has much better control on false positives than SVRF because of window constraints. SBG can use a fuzzy nature to detect systematic failing patterns. Besides fuzzy searches, SBG also can perform specific or crisp searches.

SBG can enable a fuzzy description of the geometric primitive arrangement that can capture an essence of the required primitive shape properties and their spatial relationships to one another. The arrangement can be described by the image itself (and its automated analysis) rather than a set of complex codes written using a scripting language, such as SVRF.

In another embodiment, SBG can be used for the automatic setting of micro care areas (MCA) for nanopoint (NP) inspection for increased inspection sensitivity at these hotspots.

In yet another embodiment, SBG can be used for defect discovery. A rule inference engine (RIE) can infer the local design description of the hotspots from the location of defects reported by an inspection tool. The RIE can use this information to improve the efficiency of the review sampling of systematic defects at hotspots or for the automatic setting of MCA for NP inspection.

Figure 1:
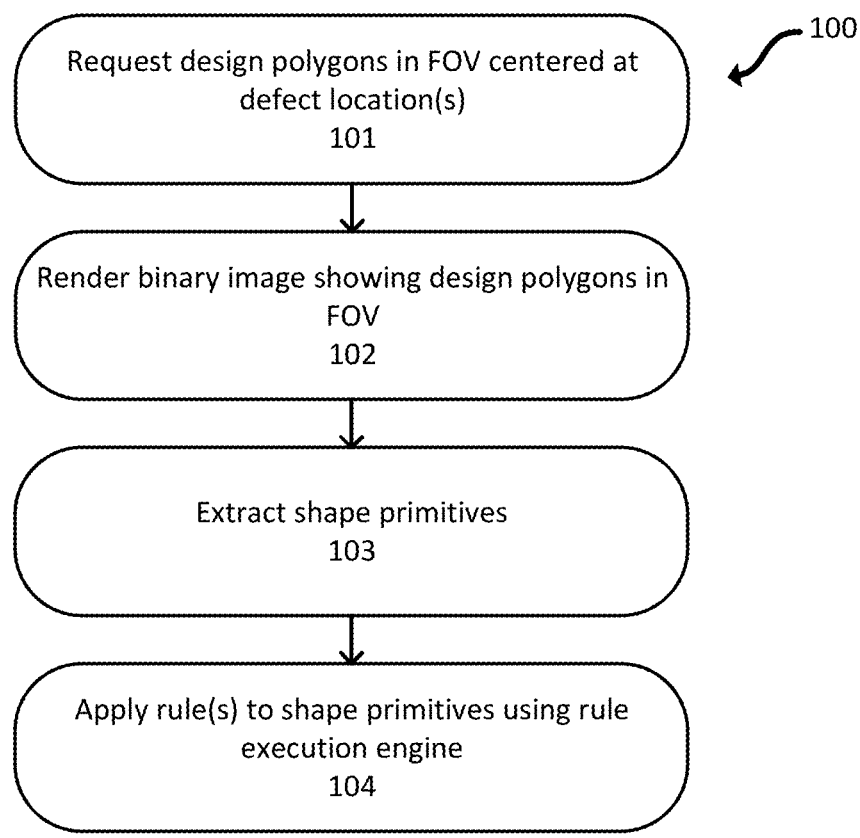
FIG. 1 is a flowchart in accordance with an embodiment of the present disclosure.

FIG. 1 is a flowchart of a method 100. Design polygons in a field of view (FOV) centered at one or more defect locations of a wafer are requested 101. These design polygons may be inside or intersecting the FOV. For example, a wafer can be loaded onto a stage of a review tool and imaged. The resulting image of the wafer can be used to determine defect locations. A binary image showing the design polygons in the field of view is rendered 102. During the rendering, the geometry in terms of coordinate numbers may be digitized and drawn as a binary image. For example, the binary image may have white for the foreground (e.g., inside the polygon) and black for the background (e.g., outside the polygon). The resolution of this binary image can be arbitrarily small, such as down to one Angstrom or the smallest resolution unit at which the polygon vertices are defined.

Figure 2:
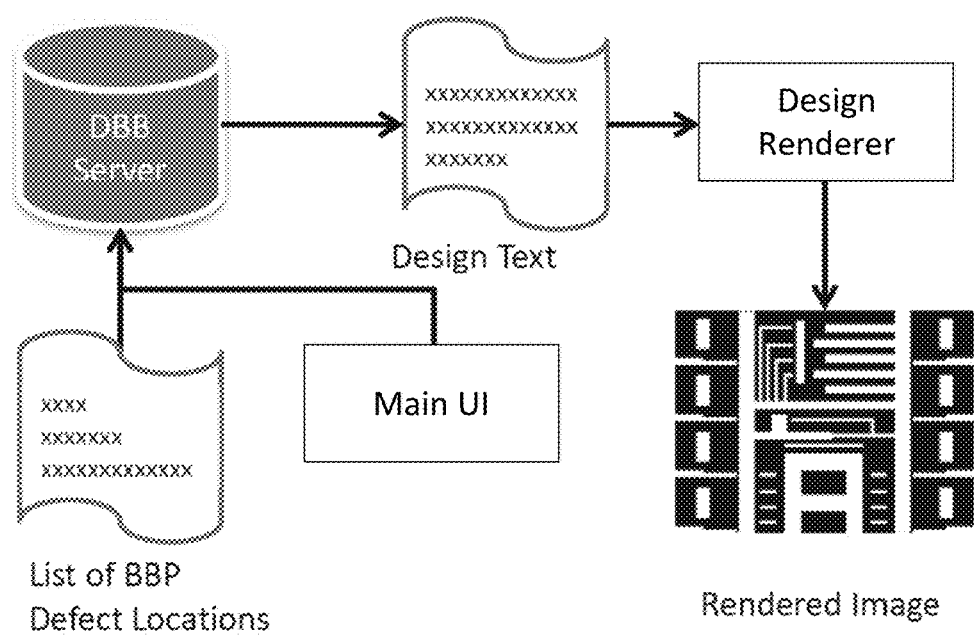
FIG. 2 represents generation of a rendered image in accordance with the present disclosure.

Shape primitives that define local topological and geometric properties of a design are extracted 103. In certain configurations, the primitives may be indicative of a defect. Given the list of defect locations from the inspection (e.g., using the BBP tool as shown in FIG. 2) and using the Main UI, the design database server (e.g., a DBB server) can output all the design polygons in the FOV of given physical dimensions. For example, the dimensions may be 2 μm or 4 μm centered at a defect location, though other dimensions or locations for centering are possible. This output may be at the request of a user or a controller. The DBB server can output a design text file with the requested information. Then a software module, which can be referred to as a design renderer, can take the design text file as input and render a binary image showing the design polygons in the FOV at a user-defined pixel size.

Figure 10:
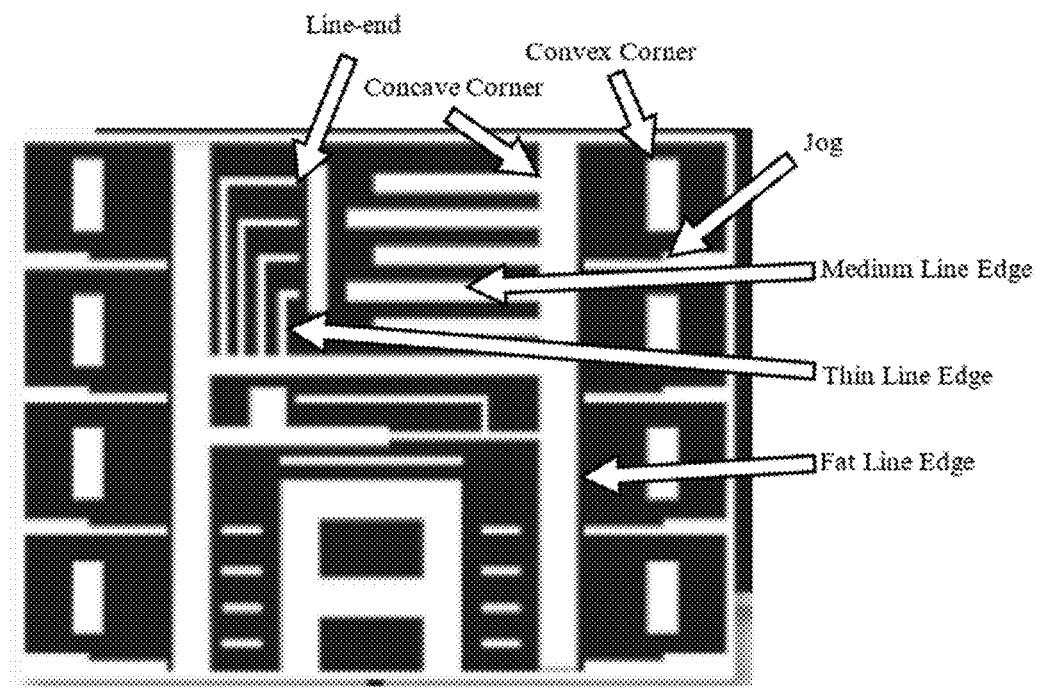
FIG. 10 is a die with exemplary shape primitives.

SBG can define at least the following shape primitives: edges of thin, medium, and fat lines; convex corners; concave corners; line-ends; and jogs. These shape primitives are more detailed than just an edge, as is used in SVRF. Some shape primitives are illustrated in FIG. 10. Other shape primitives besides those listed are possible. In addition, SBG can define a direction or orientation for each shape primitive.

Figure 3:
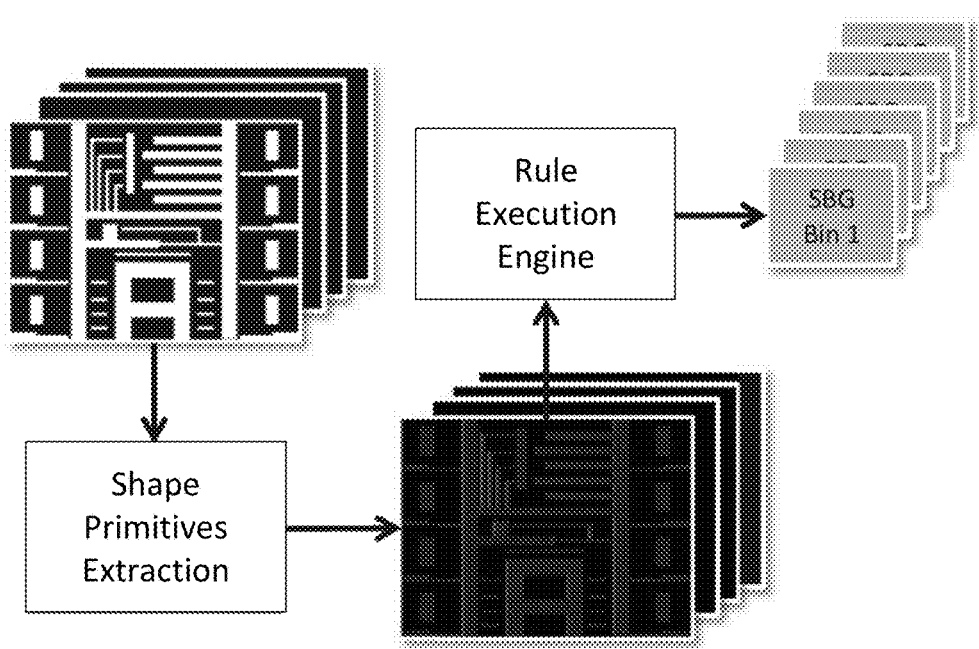
FIG. 3 represents generating SBG bins based on shape primitives extraction in accordance with the present disclosure.

As shown in FIG. 3, various shape primitives that define local topological and geometric properties of the design are extracted. The extractions are carried out by a series of computer vision algorithms operating on the rendered design. For example, a technique for shape primitive extraction is described in U.S. Pat. No. 7,877,722, which is incorporated by reference in its entirety.

FIG. 3 shows an intermediate picture of the result of such algorithms. However, this intermediate picture is merely an example. The results from this module may be fed directly into the rule execution engine.

Turning back to FIG. 1, at least one rule to the shape primitives is applied 104 using a rule execution engine. The rule execution engine, which can be incorporated into a controller that extracted the shape primitives or can be part of a separate controller, can search for an occurrence of the shape primitives covered by the at least one rule. The shape primitives may have been identified. The rule can indicate presence of a defect or the likelihood of a defect being present based on presence of one or more shape primitives and/or based on arrangement of one or more shape primitives. Rules can be applied in a rule interaction window. The rule can be applied to a single layer on a wafer or to multiple layers on a wafer. For example, a rule can be applied to a particular layer (e.g., a current layer), but also previously-formed or subsequently-formed layers. The size of the rule interaction window can vary based on the type of device or type of rule.

Figure 11:
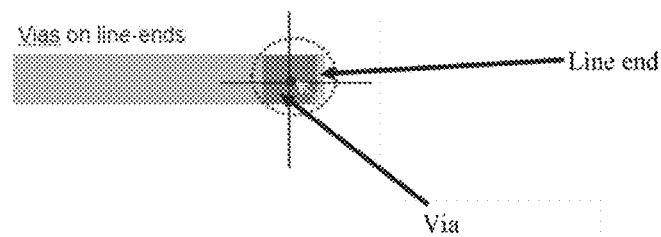
FIG. 11 illustrates an exemplary rule.

An exemplary rule is illustrated in FIG. 11. A line end is "above" a via. The line is on one plane and the via is on the layer below.

Binning or grouping of defect locations based on their geometrical shapes and relationship between shapes as captured in rules can be performed. As shown in FIG. 3, the Rule Execution Engine operates on the extracted shape primitives, applies user-defined rules, and generates SBG bins.

For the SBG assisted defect inspection use case (see the "A priori NP MCAs" block in FIG. 7), the SBG bins can be used to group the locations at which defects are detected by the inspector. The bin can be defined by, for example, the set of SBG rules that are triggered at that location, or the most complex rule that is triggered at that location. This complexity score of a rule may be a measure of the a priori likelihood of the design failing at a location where that rule hits. This likelihood can be estimated from a statistical analysis of past defects detected, can be generated by physical modeling of the defect mechanism, or by inspecting a so-called process window qualification (PWQ) wafer where focus and exposure are intentionally modulated on a per die basis and the wafer is then scanned by an inspector to determine the perturbation in focus/exposure required to cause a particular geometry to fail. The complexity score of a rule could also be a purely user-defined preference score to detect or sample a defect in a particular geometry.

For the SBG assisted review sampling use case (see the "SBG Binning for Sampling" block in FIG. 7), the complexity score of the SBG bins can be used to better sample the set of defects to be reviewed after an inspection. There may be more reason to sample a location with greater likelihood of a weak design location. The lower this likelihood, then there may be more reason to treat that location as a nuisance (e.g., a false positive unlikely to be a defect) that is not sampled.

Figure 4:
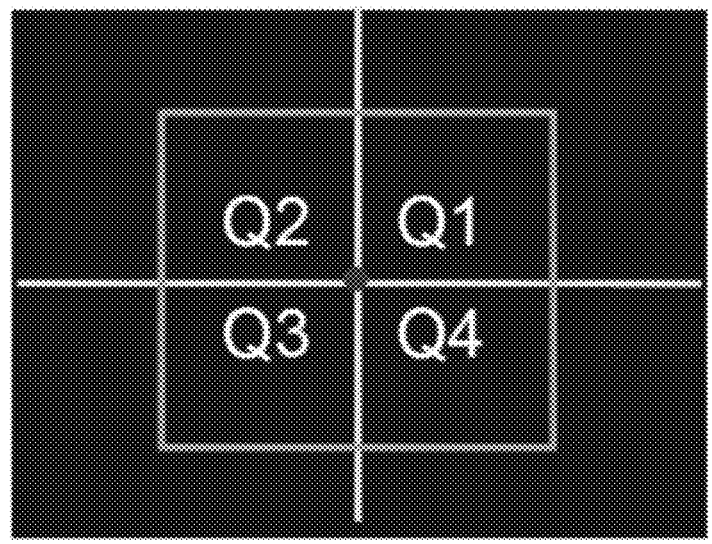
FIG. 4 is a first embodiment of a rule interaction window.
Figure 5:
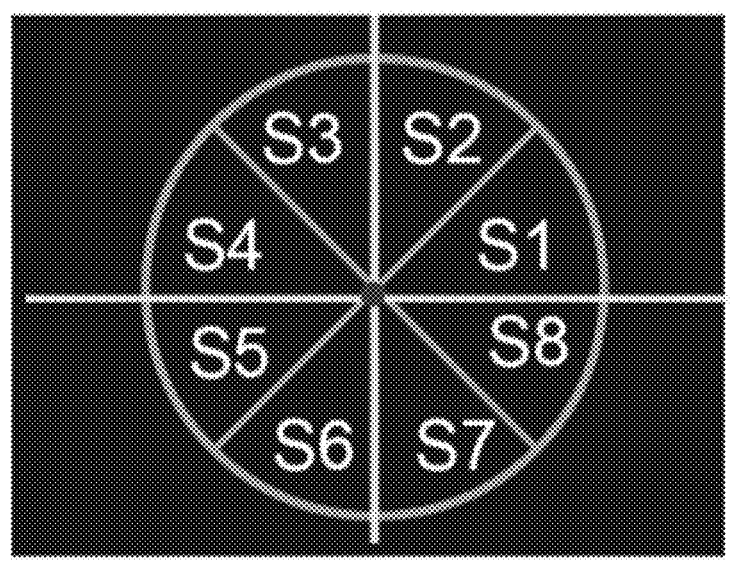
FIG. 5 is a second embodiment of a rule interaction window.

The user-defined rules are applied at the center of a window marked by a solid circle in FIG. 4 called the rule interaction window, the size of which can be specified by the user for a given rule. The rule interaction window is marked by a rectangle with a specified size in FIG. 4. Rules reflecting the spatial relationship within the interaction window between the shape primitives are captured by the co-occurrence of the primitives in the four quadrants Q1, Q2, Q3, and Q4 shown in FIG. 4. Instead of having rectangular windows, one could have a circular rule interaction window with a specified size with rules defined by co-occurring shape primitives in eight sectors S1, S2, S3, S4, S5, S6, S7, and S8 as shown in FIG. 5. Other rule interaction window or sector/quadrant shapes are possible. Other numbers of sectors/quadrants also are possible. Primitives can be found in one or more quadrants or sectors. While a single rule interaction window is disclosed, more than one rule interaction window may be used. If two rule interaction windows are used, these two rule interaction windows can overlap, can be in contact, or can be separated from one another. In general, there is some local proximity condition for an SBG rule. This may be less than a few hundred nanometers or other dimensions.

An example of a two window rule is shown in FIG. 9. Both the small window and the enclosing larger window are concentric and need to contain the specified primitives (shown by solid circles) for the rule to be triggered. The inner short-range window specifies the local context that must be satisfied for a defect to occur at the center, while the outer long-range window specifies the neighboring context that causes the failure (e.g., why the defect occurs at the common window center). In the example shown in FIG. 9, there is the possibility of a short/bridge developing at the window center.

Figure 6:
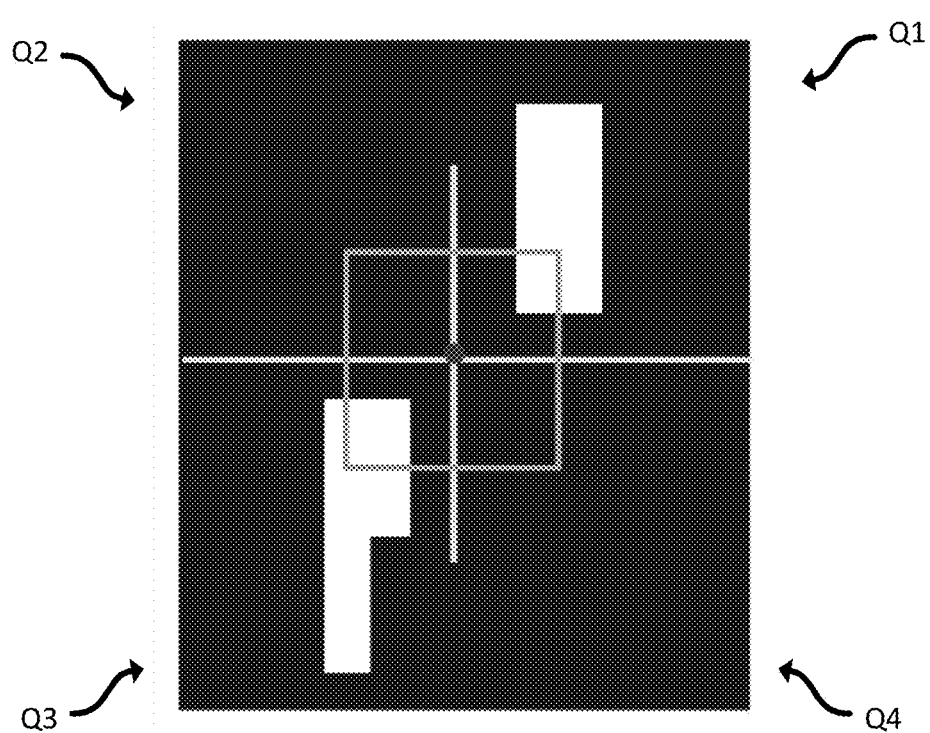
FIG. 6 is an exemplary rule with shape primitives.

A rule as depicted in FIG. 6 may be the co-occurrence of two corners in opposite directions, one in quadrant Q1 and the other in quadrant Q3. Furthermore, group D8 actions affecting primitive co-occurrences may automatically be taken into account in the Rule Execution Engine. D8 refers to the eight possible transformations of a figure about its horizontal and vertical axes with the origin at the center of the figure. These include 90, 180 and 270 degree rotations and mirroring (about the x or y axes).

The cross-hair in FIG. 6 can be placed on, for example, an open, on a short, or at an intersection. Other positions for the cross-hair are possible. The cross-hair can be a center of the rule interaction window or can be at other positions in the rule interaction window.

FIG. 9 is a compound rule which requires the shape primitives and orientations of those shape primitives as specified by the solid circles (only one of which is labeled for ease of reference). For example the quadrant Q2 of the inner (short-range) window in FIG. 9 has a "vertical thin line edge pointing right" primitive. The quadrant Q2 of the outer (long-range) window in FIG. 9 not only has that primitive, but also two others: a "vertical thin line edge pointing left" and a "line-end pointing down."

The shape primitives can be fuzzy and may not have straight or solid edges. Use of quadrants or sectors provides flexibility to look for other shape primitives in an adjacent quadrant or sector. Besides an exact geometric match with the template design, there may be other similar geometrical arrangements that are also weak and, thus, could fail. It is this similarity aspect that can be captured by a fuzzy rule, such as SBG. While there may be some false positives as far as looking at potential sites for such failures, the greater risk is missing such locations and, thus, missing weak spots.

Note that the inspector inspects all regions, but can assign different sensitivities to different regions. SBG can help segment the die into regions of low, moderate, and high complexity or likelihood of failure and one can inspect these regions with different sensitivities.

SBG can work over multiple layers and multi-patterning on a layer. The general rules of SBG can allow a user to specify the layer or patterning on which a shape primitive should occur. Co-occurrences of shape primitives on different layers or masks allow rules that govern such inter layer interactions to be specified.

A rule can be conditioned based on the underlying difference signal from the BBP inspection tool. For example, the larger the signal, the greater the evidence of the rule.

Figure 7:
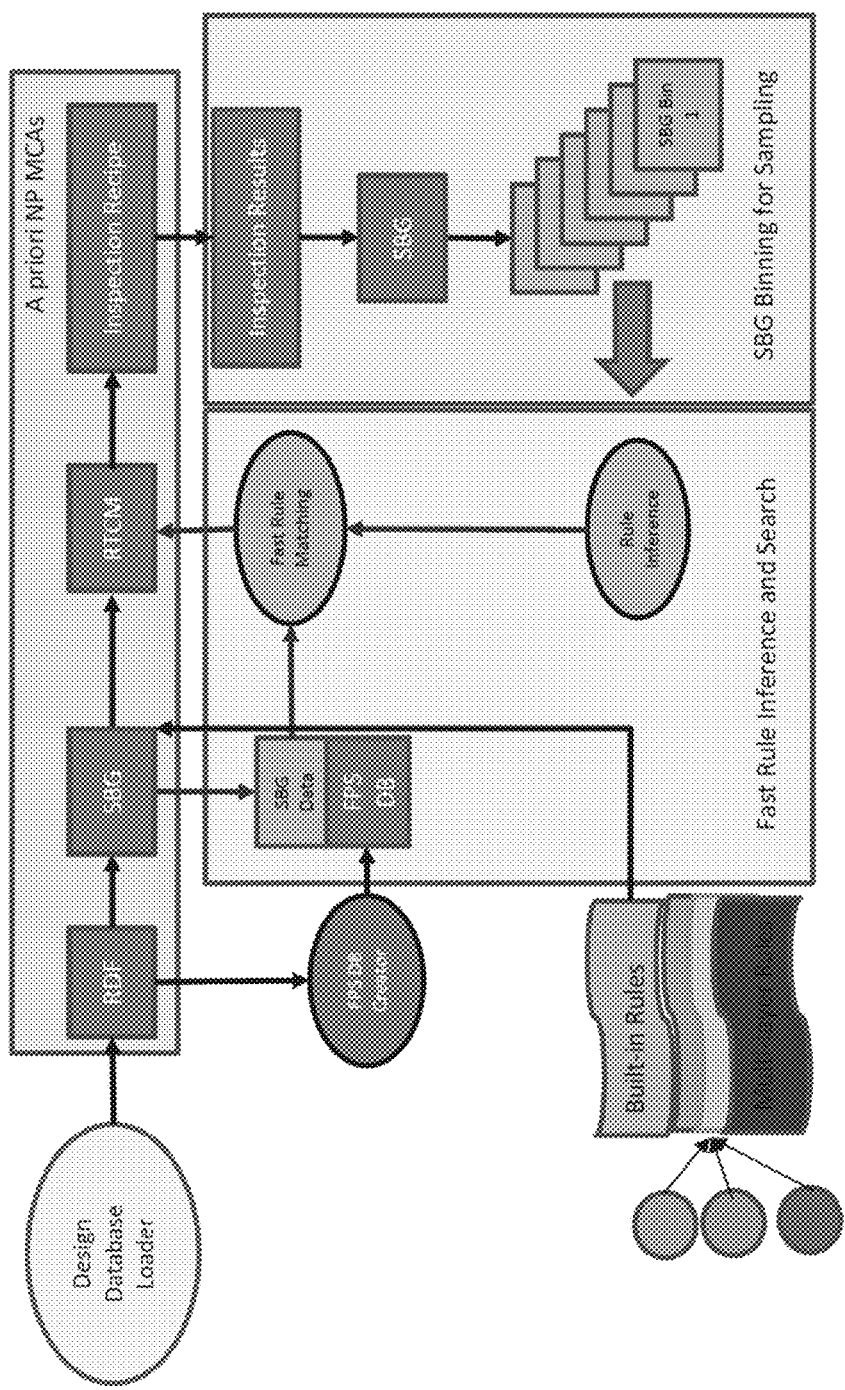
FIG. 7 is a flowchart representing use cases in accordance with the present disclosure.

FIG. 7 shows at least three use cases: defect binning for sampling purposes, generation of micro care areas for NP inspection, and inferring rules from an inspection result.

For generation of micro care areas for a NP inspection recipe (upper box of FIG. 7), the design data is first loaded into the Reticle Definition Format (RDF), which is a data format into which the design data (e.g., GDS or OASIS data) is converted for purposes of rapid access by the inspector. It is then operated on by the SBG algorithm which extracts shape primitives and finds locations where each rule is triggered. These locations are then converted to a Run-Time Context Map (RTCM) that is used by the inspector to assign different sensitivities to different regions based on the rule(s) triggered and their criticality. The RTCM is a flattened (non-hierarchical) polygonal description of care areas (inspection areas). Each such polygon is labeled with a sensitivity tag that is utilized by the inspection algorithm to set defect detection thresholds. The defects generated by the inspection can be grouped into the SBG bins shown based on the rules triggered at the defect locations.

Rules can be inferred from an inspection result, such as a hot inspection result (box in lower left of FIG. 7). A hot inspection may be one where the detection threshold (e.g., the minimum difference in die-to-die gray level) to determine whether a pixel is defective or not is set to a low value. Hence such a detection recipe would find a large number of defects. Users can tune the threshold to catch only the real ones and filter out false detections such as noise or nuisance defects. In an instance, a hot inspection recipe is run. For example, a NP recipe which inspects areas of high density with high sensitivity, regions of moderate sensitivity with moderate sensitivity, and low density areas with low sensitivity. Sensitivities can be set using a threshold or other techniques. The defect locations (and their design clips) are fed to the box marked "Rule Inference." This algorithm automatically deduces the likely set of rules that can explain the population of defect locations that were found. These rules are compared with existing rules in the SBG data repository. If there is a match, the rule is not added to the database. Otherwise, a rule is added to the database. These rules can then be used to generate the RTCM for subsequent inspections. This rule inference flow allows the incremental addition of rules to the database as a result of inspecting several wafers, since one wafer may not necessarily exhibit all the failure cases, particularly if it is low probability event.

A feedback loop is illustrated in FIG. 7 with the arrows leading from the SBG Bin 1 toward the Rule Inference, then the Fast Rule Matching, and then the RTCM. This feedback loop can be noise-based or criticality-based. The results of SBG binning of defects can be used to infer rules from the shape primitives. These rules can be applied to generate new care areas (e.g., RTCM) for the next wafer to be inspected.

A filter can be used to reduce nuisances. In an instance, an SBG-based binning (as shown by the "SBG Binning for Sampling" block in FIG. 7) can be performed, and certain bins can be discarded since they are unlikely to be defects (e.g., small magnitude events in bare areas of the design). In another instance, defect properties such as shape, energy, or peak amplitude may be used to filter out nuisance events.

While design clips are disclosed as a source for generating shape primitives, an image (e.g., an SEM image) can be used as a source for generating shape primitives. The SEM image may be converted into a binary design image or otherwise modified to enable generation of shape primitives.

The embodiments disclosed herein provide multiple advantages. SBG can be a qualitative language that expresses local spatial relationships between shapes in a design. Such a language can be relatively easy for a user to encode rules in and can allow a user to write rules that specify weak local design geometries in terms of shape primitives and spatial relationships between them. This can be used to sample rare but important defect types for review. Furthermore, the RIE can be used to infer new rules from designs on which no existing rules are triggered. This not only leads to defect discovery, but gives the user the transparency to understand the new rules that ought to be in the rules table. The language for SBG can capture a geometry description at a hotspot where the local design configuration causes the systematic defect. SBG grouping can be used to sample (for review) or sensitize inspection (though NP care areas) to weak design locations, which can promote a condition for efficient review sampling. The qualitative fuzzy nature of SBG grouping yields a far lesser number of groups than the strict matching that DBG does. Since each group in SBG corresponds to a weak local design cause, it promotes a condition for efficient review sampling.

In terms of ease of use, SBG may not require a complex script. As seen in FIG. 9, the design is shown with the marked shape primitives. The SBG analysis program can infer the "dots" from this image clip and thus has "learned" the rule.

SBG not only addresses the problem of checking the relational parameters of design heavily impacted by proximity effects, but also can provide a user with a scope to consider the extent of those proximity effects. The rule interaction window concept in SBG can be a measure of proximity and can indirectly take into account the dimensional checks like width, space, and area. A rule has the concept of a given window size and the window is divided into quadrants. Thus, it implicitly allows for the definition of space (quadrant size), distance (e.g., in opposite quadrants versus same quadrant), and area (quadrant/window area). The position of the shape primitives may not be exactly specified within each quadrant. Instead, the presence and orientation or each shape primitive may be specified in a quadrant. Thus, the rule may be fuzzy, but at the same time precise enough since it requires those primitives to be within a certain distance from each other and in a certain orientation with respect to each other.

SBG can include a UI called context rule visualizer (CRV) that allows the user to check and debug rules. SBG can bridge the gap between same and similar kinds of patterns due to its terminology. In contrast to SVRF, tagging a line-end or a line with specific corners is easy using the language of SBG. Furthermore, the binning of defect designs based on SBG's relational approach can be a better and more accurate pointer to process or manufacturing flaws. Weak geometries can be characterized by so-called "attacking" structures, such as a line end attacking another line (perpendicular to the line end). SBG provides an efficient way to describe these kinds of interactions through the use of windows and quadrants. This allows for a more accurate description of what makes a particular design "weak." SBG provides fuzziness by allowing the required shape primitives to be anywhere in the quadrant without sacrificing the relationship it has with other geometries in other quadrants. Hence, it retains its dimensional fuzziness without sacrificing its relational (between shape primitives) precision.

Techniques disclosed herein can be used for sampling and inspection. SBG during inspection can be used to identify potential weak spots. Thresholds can be set to catch certain defects or types of defects. For example, a user can assign a complexity score to a given design location. Certain defects can be filtered out by applying a threshold appropriate to the complexity score at that location. For example, defects detected in low complexity score locations are more likely to be noise (e.g., induced by film thickness variations) instead of by some design-systematic defects caused by the "weakness" of those design (e.g., susceptibility to failure due to small focus or exposure variations).

Moreover, regions with higher complexity scores can be inspected with lower (more sensitive) thresholds, since they are more likely to fail.

Sampling can use these techniques to increase throughput. SBG can be used to flag certain parts of a wafer as potentially including a defect. In an example, only these flagged parts are sampled. This can increase sampling efficiency and can reduce nuisances.

SBG also can be used to group by context. Similar objects or shape primitives can be grouped together. Differences or outliers can be evaluated in a die-to-die comparison. Similar geometries may have similar noise when compared die-to-die.

A rule indicates a hit at a location if the local spatial relationship between its shape primitives is satisfied at that location. Besides this relationship between shape primitives, every rule can have a complexity score. This complexity score of a rule may be a measure of the a priori likelihood of the design failing at a location where that rule hits. It could also be a purely user-defined preference score to detect or sample a defect in a particular geometry. In the former case, the likelihood can be estimated as discussed with respect to the "A priori NP MCAs" block in FIG. 7.

The criticality value of a location where no rules hit may be zero. This may be a location that has no user interest even if it has a bona fide defect on it. A similar reasoning applies to a location where only rules with low complexity scores are hit. Thus, defects detected at zero or low criticality locations can be treated as nuisances.

The criticality value of a location where exactly one rule is hit is given by the complexity score of that rule.

When multiple rules are hit at a location, there are multiple ways to combine their individual complexity scores to provide a composite criticality value for that location. One method is to assign the maximum of the complexity scores of the multiple rules hitting a location as the criticality value for that location. This method can ensure that highly critical locations have highly complex rules being triggered. Other methods can be used, including summation, proportional summation, or others that may be used to combine the complexity scores of the multiple rules hitting a location to form the criticality value for that location.

Figure 8:
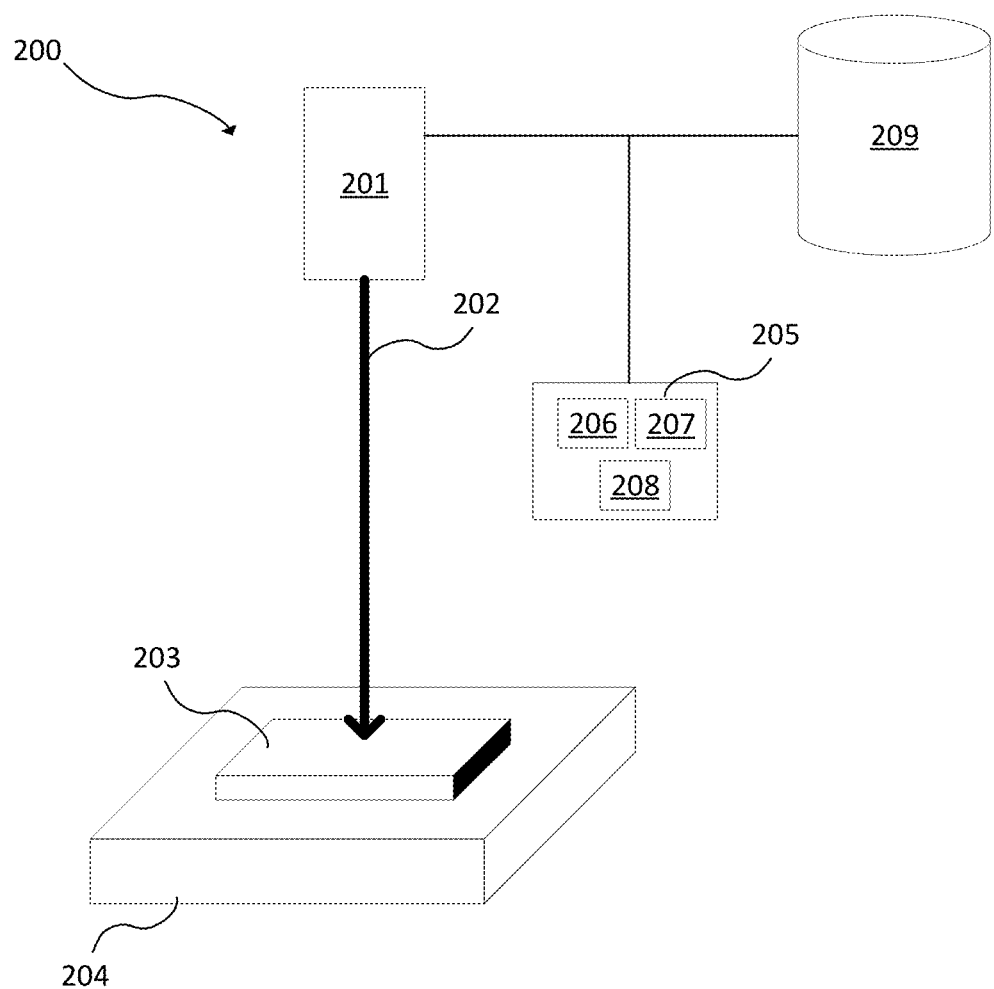
FIG. 8 is a block diagram of an embodiment of a system in accordance with the present disclosure.

FIG. 8 is a block diagram of a system in accordance with the present disclosure. A controller 205 is in electronic communication with a defect review system 200 and/or a design based binning (DBB) server 209.

The defect review system 200 includes a stage 204 configured to hold a wafer 203 or other workpiece. The stage 204 may be configured to move or rotate in one, two, or three axes. The defect review system 200 also includes an image generation system 201 configured to generate an image of a surface of the wafer 203. The image may be for a particular layer or region of the wafer 203. In this example, the image generation system 201 produces an electron beam 202 to generate a test image 203. Other image generation systems 201 are possible, such as those that use broad band plasma or laser scanning. For example, dark field imaging or bright field imaging can be performed by the image generation system 201. The defect review system 200 and/or image generation system 201 can generate a test image of the wafer 203.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

In a particular example, the defect review system 200 is part of or is an SEM. Images of the wafer 203 are generated by scanning the wafer 303 with a focused electron beam 202. The electrons are used to produce signals that contain information about the surface topography and composition of the wafer 203. The electron beam 202 can be scanned in a raster scan pattern, and the position of the electron beam 202 can be combined with the detected signal to produce an image.

The DBB server 209 is configured to store design images for semiconductor wafers or other workpieces.

The defect review system 200 and the DBB server 209 can communicate with the controller 205. For example, the controller 205 can communicate with the image generation system 201 or other components of the defect review system 200. The controller 205 can include a processor 206, an electronic data storage unit 207 in electronic communication with the processor 206, and a communication port 208 in electronic communication with the processor 206. It is to be appreciated that the controller 205 may be implemented in practice by any combination of hardware, software, and firmware. Also, its functions as described herein may be performed by one unit, or divided up among different components, each of which may be implemented in turn by any combination of hardware, software, and firmware. Program code or instructions for the controller 205 to implement the various methods and functions described herein may be stored in controller readable storage media, such as a memory in the electronic data storage unit 207, within the controller 205, external to the controller 205, or combinations thereof.

The controller 205 may be coupled to the components of the defect review system 200 or DBB server 209 in any suitable manner (e.g., via one or more transmission media, which may include "wired" and/or "wireless" transmission media) such that the controller 205 can receive the output generated by the defect review system 200, such as output from the imaging device 201, or output generated by the DBB server 209. The controller 205 may be configured to perform a number of functions using the output. For instance, the controller 205 may be configured to review defects on the wafer 203 using the output. In another example, the controller 205 may be configured to send the output to an electronic data storage unit 207 or another storage medium without performing defect review on the output. The controller 205 may be further configured as described herein, such as to perform the embodiments of FIG. 1 or FIG. 7. The controller 205 also may be configured to send instructions to a review, inspection, or metrology tool for sampling, imaging, inspection, or metrology purposes.

The controller 205, other system(s), or other subsystem(s) described herein may take various forms, including a personal computer system, image computer, mainframe computer system, workstation, network appliance, internet appliance, or other device. In general, the term "controller" may be broadly defined to encompass any device having one or more processors that executes instructions from a memory medium. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

An additional embodiment relates to a non-transitory computer-readable medium storing program instructions executable on a controller for performing a computer-implemented method for identifying abnormalities on a wafer or detecting compliance/non-compliance, as disclosed herein. In particular, as shown in FIG. 8, electronic data storage unit 207 or other storage medium may contain non-transitory computer-readable medium that includes program instructions executable on the controller 205. The computer-implemented method may include any step(s) of any method(s) described herein.

Program instructions implementing methods such as those described herein may be stored on computer-readable medium, such as in the electronic data storage unit 207 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension), or other technologies or methodologies, as desired.

Controller 205 may be configured according to any of the embodiments described herein. For example, the controller 205 may be programmed to perform some or all of the steps of FIG. 1 or 7.

While disclosed as part of a defect review system, the controller 205 described herein may be configured for use with inspection systems. In another embodiment, the controller 205 described herein may be configured for use with a metrology system. Thus, the embodiments as disclosed herein describe some configurations for classification that can be tailored in a number of manners for systems having different imaging capabilities that are more or less suitable for different applications.

Each of the steps of the method may be performed as described further herein. The methods also may include any other step(s) that can be performed by the controller and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
   a review tool, wherein the review tool includes:
      a stage configured to hold a wafer; and
      an image generation system configured to generate an image of the wafer; and
   a controller in electronic communication with the review tool, wherein the controller is configured to:
      request design polygons in a field of view centered at one or more defect locations of the wafer;
      render a binary image showing the design polygons in the field of view;
      extract shape primitives that define local topological and geometric properties of a design; and
      apply at least one rule to the shape primitives using a rule execution engine, wherein the rule execution engine searches for an occurrence of the shape primitives covered by the at least one rule, and wherein the rule corresponds to presence of a defect.

2. The system of claim 1, wherein the controller includes a processor and a communication port in electronic communication with the processor and the electronic data storage unit.

3. The system of claim 1, wherein the review tool is a broad band plasma tool.

4. The system of claim 1, wherein the image generation system is configured to use at least one of an electron beam, a broad band plasma, or a laser to generate the image of the wafer.

5. The system of claim 1, wherein the controller is further configured to generate shape-based grouping bins with the rule execution engine.

6. The system of claim 1, the rule applies to the shape primitives on multiple layers of the wafer.

7. The system of claim 1, wherein the rule is applied in a rule interaction window.

8. The system of claim 1, wherein the controller is further configured to infer one or more additional rules for a population of the defect locations.

9. A method comprising:
  requesting, using a controller, design polygons in a field of view centered at one or more defect locations of a wafer;
  rendering, using the controller, a binary image showing the design polygons in the field of view;
  extracting, using the controller, shape primitives that define local topological and geometric properties of a design; and
  applying at least one rule to the shape primitives using a rule execution engine, wherein the rule execution engine searches for an occurrence of the shape primitives covered by the at least one rule, and wherein the rule corresponds to presence of a defect.

10. The method of claim 9, further comprising generating, using the controller, shape-based grouping bins with the rule execution engine.

11. The method of claim 9, wherein the rule applies to the shape primitives on multiple layers of the wafer.

12. The method of claim 9, wherein the rule is applied in a rule interaction window.

13. The method of claim 9, further comprising inferring one or more additional rules for a population of the defect locations.

14. The method of claim 9, further comprising:
  loading the wafer onto a stage of a review tool; and
  imaging the wafer on the stage.

15. The method of claim 9, further comprising:
  determining at least one location of the occurrence of the shape primitives covered by the at least one rule;
  converting the at least one location to a map that is configured to assign a sensitivity to different regions based on the rule and criticality; and
  binning the defect at the at least one location.

16. A non-transitory computer-readable storage medium, comprising one or more programs for executing the following steps on one or more computing devices:
  requesting design polygons in a field of view centered at one or more defect locations of a wafer;
  rendering a binary image showing the design polygons in the field of view;
  extracting shape primitives that define local topological and geometric properties of a design; and
  applying at least one rule to the shape primitives using a rule execution engine, wherein the rule execution engine searches for an occurrence of the shape primitives covered by the at least one rule, and wherein the rule corresponds to presence of a defect.

17. The non-transitory computer-readable storage medium of claim 16, wherein the steps further comprise generating shape-based grouping bins with the rule execution engine.

18. The non-transitory computer-readable storage medium of claim 16, wherein the rule applies to the shape primitives on multiple layers of the wafer.

19. The non-transitory computer-readable storage medium of claim 16, wherein the steps further comprise inferring one or more additional rules for a population of the defect locations.

20. The non-transitory computer readable storage medium of claim 16, wherein the steps further comprise:
  determining at least one location of the occurrence of the shape primitives covered by the at least one rule;
  converting the at least one location to a map that is configured to assign a sensitivity to different regions based on the rule and criticality; and
  binning the defect at the at least one location.

* * * * *